United States Patent
Inoue (10) Patent No.: US 11,837,689 B2
(45) Date of Patent: Dec. 5, 2023

(54) CURRENT COLLECTOR INCLUDING OPENING FORMATION PORTION AND BATTERY USING SAME

(71) Applicant: NEC Corporation, Tokyo (JP)

(72) Inventor: Kazuhiko Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 305 days.

(21) Appl. No.: 16/641,052

(22) PCT Filed: Sep. 14, 2018

(86) PCT No.: PCT/JP2018/034147
§ 371 (c)(1),
(2) Date: Feb. 21, 2020

(87) PCT Pub. No.: WO2019/059117
PCT Pub. Date: Mar. 28, 2019

(65) Prior Publication Data
US 2021/0036374 A1 Feb. 4, 2021

(30) Foreign Application Priority Data
Sep. 21, 2017 (JP) .................. 2017-181438

(51) Int. Cl.
*H01M 10/0585* (2010.01)
*H01M 4/74* (2006.01)
*H01M 4/02* (2006.01)

(52) U.S. Cl.
CPC ....... *H01M 10/0585* (2013.01); *H01M 4/745* (2013.01); *H01M 2004/027* (2013.01); *H01M 2004/028* (2013.01)

(58) Field of Classification Search
CPC ............ H01M 10/0585; H01M 4/745; H01M 2004/027; H01M 2004/028; H01M 4/64; Y02E 60/10; Y02P 70/50
See application file for complete search history.

(56) References Cited

U.S. PATENT DOCUMENTS

| 6,399,253 B1 | 6/2002 | Chang et al. |
| 2003/0099885 A1 | 5/2003 | Kim et al. |

(Continued)

FOREIGN PATENT DOCUMENTS

| CN | 1272699 A | 11/2000 |
| CN | 1457520 A | 11/2003 |

(Continued)

OTHER PUBLICATIONS

Machine translation of JP 2017-059458A, Kunikawa et al., 2017 (Year: 2017).*

(Continued)

*Primary Examiner* — Kwang Han
(74) *Attorney, Agent, or Firm* — Sughrue Mion, PLLC (57) ABSTRACT

The purpose of the present invention is to provide a current collector that has high strength and is easily impregnated with an electrolyte. This current collector is provided with an opening formation portion provided with a plurality of openings, the current collector being characterized in that a protruding portion is formed at the tip of each opening, and only partial locations of the opening formation portion reach an end surface of the current collector and the other locations thereof do not reach the end surface.

23 Claims, 7 Drawing Sheets

(56) References Cited

U.S. PATENT DOCUMENTS

| | | | |
|---|---|---|---|
| 2009/0108502 A1* | 4/2009 | Kogetsu | H01M 4/661 428/131 |
| 2012/0210548 A1 | 8/2012 | Sawai et al. | |
| 2016/0141721 A1* | 5/2016 | Mimura | H01M 4/139 429/162 |
| 2016/0260983 A1* | 9/2016 | Ramasubramanian | H01M 4/74 |
| 2017/0025704 A1* | 1/2017 | Sawai | H01M 4/661 |

FOREIGN PATENT DOCUMENTS

| | | | | |
|---|---|---|---|---|
| CN | 1992394 A | | 7/2007 | |
| CN | 102598368 A | | 7/2012 | |
| JP | 60-39765 A | | 3/1985 | |
| JP | 10-106584 A | | 4/1998 | |
| JP | 11-288723 A | | 10/1999 | |
| JP | 2003-208899 A | | 7/2003 | |
| JP | 2017-059458 A | * | 3/2017 | H01M 4/74 |
| JP | 2017-059458 A | | 3/2017 | |
| JP | 2017-084495 A | | 5/2017 | |

OTHER PUBLICATIONS

Written Opinion of the International Searching Authority of PCT/JP2018/034147 dated Dec. 18, 2018.
International Search Report of PCT/JP2018/034147 dated Dec. 18, 2018.
CN Office Action for CN Application No. 201880060839.0, dated Aug. 8, 2022 with English Translation.

* cited by examiner

CURRENT COLLECTOR INCLUDING OPENING FORMATION PORTION AND BATTERY USING SAME

CROSS REFERENCE TO RELATED APPLICATIONS

This application is a National Stage of International Application No. PCT/JP2018/034147 filed Sep. 14, 2018, claiming priority based on Japanese Patent Application No. 2017-181438 filed Sep. 21, 2017, the disclosures of which are incorporated herein in their entirety by reference.

TECHNICAL FIELD

The present invention relates to a current collector, and particularly relates to a current collector that is used in a battery electrode and in which an opening is formed, and to a battery using the current collector.

BACKGROUND ART

Secondary batteries widely prevail as a power source for a portable device such as a cellular phone, a digital camera, and a notebook PC, and as a power source for a vehicle and a home. For example, a lithium ion secondary battery of a high energy density and a light weight is an energy storage device indispensable for a life.

Figure 7:
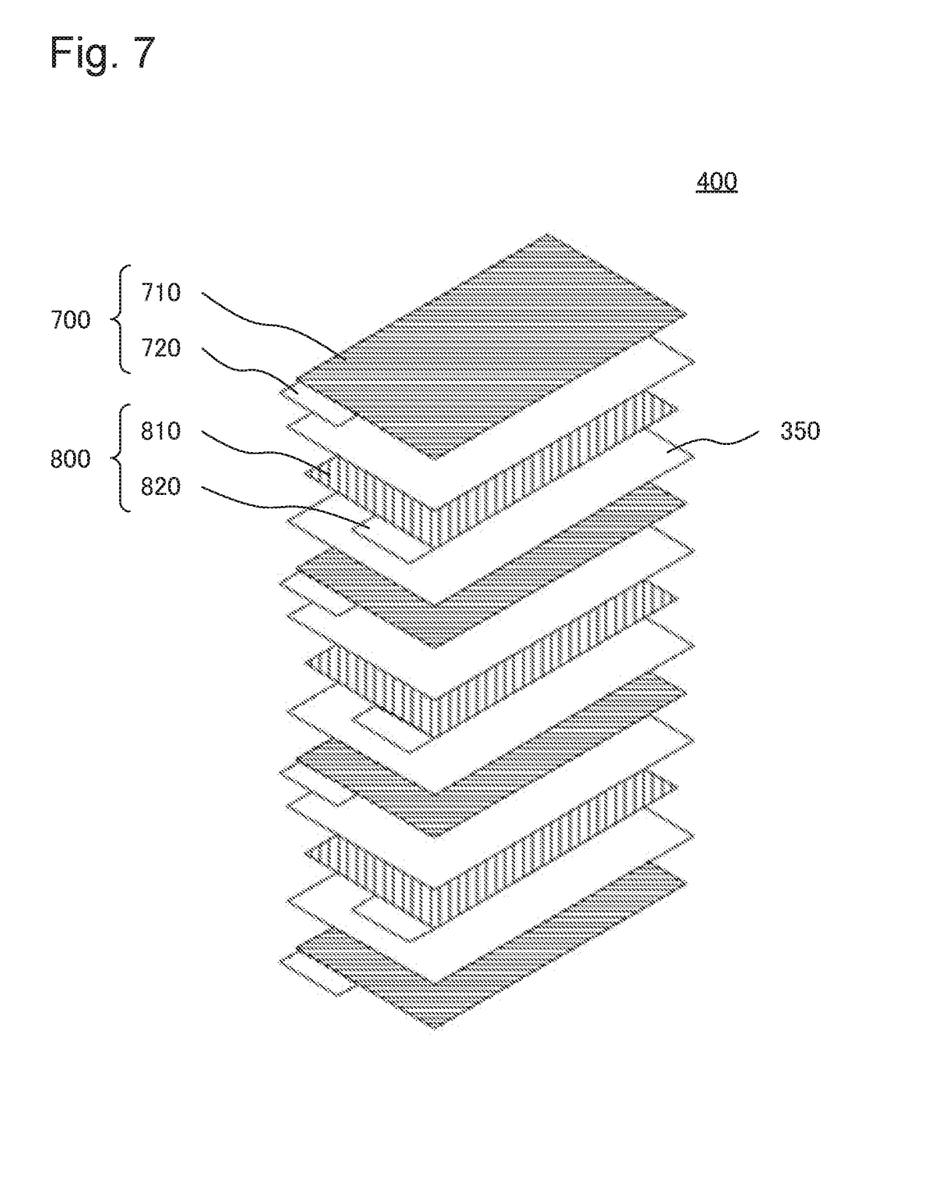
FIG. 7 is a perspective view illustrating one example of an existing stack-type lithium ion secondary battery.
Figure 8:
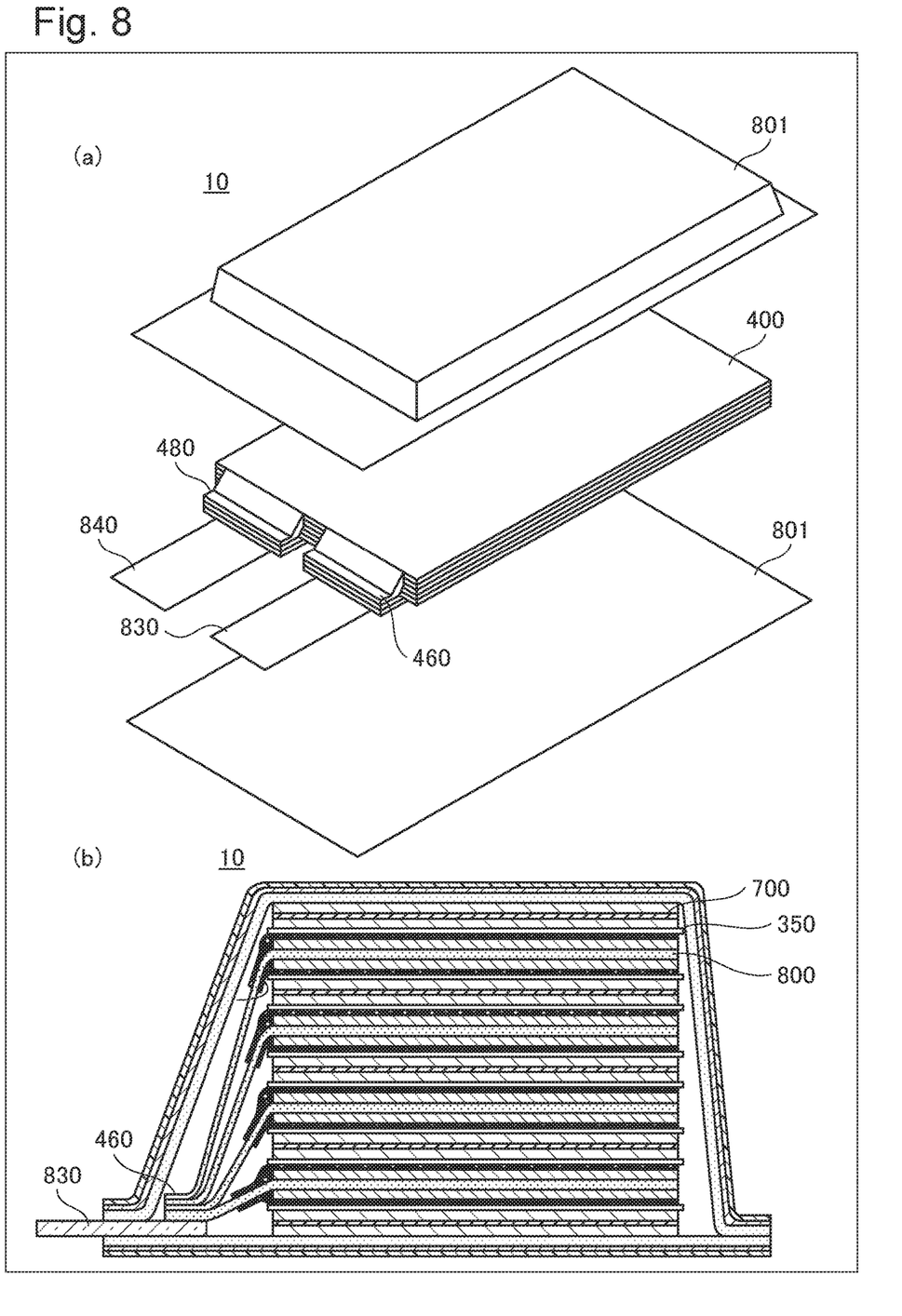
FIG. 8 is a view illustrating one example of an existing stack-type lithium ion secondary battery, (a) is a perspective view, and (b) is a cross-sectional view.

FIGS. 7 and 8 are perspective views illustrating one example of a stack-type lithium ion secondary battery 10. A battery element 400 and an exterior container 801 that encloses the battery element 400 along with an electrolytic solution are provided. As illustrated in FIG. 7, the battery element 400 in the lithium ion secondary battery 10 has a structure in which a positive electrode 800 (a cathode) and a negative electrode 700 (an anode) are alternately and repeatedly stacked while being separated from each other by a separator 350.

The positive electrode 800 is an active material layer formed on a current collector by solidifying a positive-electrode active material with a binder, and includes a positive-electrode active material formation portion 810 and a positive-electrode active material un-formation portion 820 in which an active material layer is un-formed for providing a lead portion. Similarly, the negative electrode 700 is an active material layer formed on the current collector by solidifying a negative-electrode active material with a binder, and includes a negative-electrode active material formation portion 710 and a negative-electrode active material un-formation portion 720.

The positive-electrode active material un-formation portions are bundled by ultrasonic bonding or the like, and form a positive-electrode lead portion 460, as illustrated in (a) of FIG. 8. Similarly, the negative-electrode active material un-formation portions 220 are also bundled, and form a negative-electrode lead portion 480. The positive-electrode lead portion 460 and the negative-electrode lead portion 480 are electrically connected to a positive electrode terminal 830 and a negative electrode terminal 840, respectively. (b) of FIG. 8 is a view of a cross-section of FIG. (a) of FIG. 8 cut in such a way as to include the positive electrode terminal 830.

The current collector uses a metal foil having a flat main surface, and when the battery is charged or discharged, lithium ions move between the electrodes and enter the active material layer of the positive electrode or the negative electrode, and the positive electrode or the negative electrode expands. Particularly, the negative electrode is in a state of energy higher than that in the positive electrode, and the active material layer of the negative electrode expands more than that of the positive electrode. The expanded active material layer has a risk of being peeled off from the current collector.

There is known a technique of making holes at a predetermined interval in the current collector for the purpose of preventing the active material layer from being peeled off from the current collector (for the purpose of enhancing peel resistance). In the flat current collector, the current collector merely contacts, at the flat surface, with the active material layer, and thus, the active material layer is peeled off from the current collector in some cases. However, perforation processing forms a tip of the hole into a convex shape (hereinafter, referred to as a protrusion portion), and thus, when a compound to be formed into the active material layer is formed on the current collector by coating or the like, the active material layer reaches an inside of the hole, i.e., an area other than the flat surface, and for this reason, peel resistance is improved. As a result, a battery life and safety are improved.

However, when the holes are formed, strength of the current collector foil is reduced at the cost of improvement in peel resistance of the active material. Particularly, in the negative electrode of the battery electrode, the active material largely expands or contracts due to charge or discharge, and stress acts on a peripheral portion of the current collector foil. When the holes are not formed at the peripheral portion, it is possible to resist the stress acting on the peripheral portion.

In an electrochemical device current collector 1 of PTL1 (Japanese Patent Application Laid-Open No. Hei11-288723), a peripheral portion of a quadrilateral metal sheet 2 is left as a frame-shaped and sheet-shaped continuous body 3 without being subjected to perforation processing. An inner portion surrounded by the frame-shaped and sheet-shaped continuous body 3 is subjected to perforation processing (processing as so-called grid punching, or the like) and is formed as a porous area 4 in which a large number of penetration holes 5 exist (paragraph (0017) and FIG. 1). The grid-punching metal cut portions remain as burrs, and as a result, a short circuit occurs between electrodes in some cases, however, this short circuit accident can be prevented in PTL1 since the peripheral portion is not subjected to perforation processing (paragraph 0021).

Further, in each of a positive-electrode current collector 2a and a negative-electrode current collector 3a of a secondary battery electrode disclosed in PTL2 (Japanese Patent Application Laid-Open No. 2003-208899), a large number of holes K are provided on a center side that excludes peripheral portion thereof. Specifically, these holes K are provided on the center side separated, via a non-hole portion N having width of at least about 0.5 mm, from the peripheral portion in each of the positive-electrode current collector 2a and the negative-electrode current collector 3a (paragraphs (0055) and (0056), and FIG. 2). With such a configuration, each of the positive-electrode current collector 2a and the negative-electrode current collector 3a provided with a large number of the holes K includes the non-hole portion N (i.e., a concavo-convex portion is not formed) at the peripheral portion. Thus, it is possible to prevent the positive-electrode current collector 2a and the negative-electrode current collector 3a from being stuck on the separator 4 in the course of manufacturing thereof, and to prevent the positive-electrode current collector 2a and the negative-electrode current collector 3a in advance from breaking through the separator 4 after completion thereof. Then, it is possible to prevent an internal short circuit from occurring due to these defects in the completed lithium secondary battery 1 (paragraph 0059).

CITATION LIST

Patent Literature

[PTL1] Japanese Patent Application Laid-Open No. Hei11-288723
[PTL2] Japanese Patent Application Laid-Open No. 2003-208899

SUMMARY OF INVENTION

Technical Problem

In PTL1 and PTL2, the entire peripheral portion of the current collector foil is an area where no opening is formed. However, in this case, in a manufacturing process of the battery, it becomes difficult for an electrolytic solution to enter the center portion from the peripheral portion. As described above for FIG. 8, the storage battery forms the battery element by alternately stacking the positive and negative battery electrodes. The storage battery then places the battery element in the exterior container, injects an electrolytic solution from a liquid injection port of the exterior container, and encloses the container. When the electrolytic solution is injected, the electrolytic solution enters a gap between the active material layer and the separator, a gap in the active material layer, and a gap in the separator by capillary action, and replaces air existing therein. It is desirable that the entire battery element is impregnated with the electrolytic solution as quickly as possible. However, these gaps are very narrow, and thus, it takes time for the electrolytic solution to permeate into a center of the battery element and replace air. Forming an opening in the current collector foil eliminates a wall formed by the current collector foil, thus enabling the electrolytic solution and air to move between adjacent layers in the stacked body, and accelerating impregnation of the electrolytic solution. However, when openings are not formed in the entire end surface, an air accumulation spot is formed and the impregnation stops.

An object of the present invention is to provide a current collector that solves the above-described problem, has high strength, and is easily impregnated with an electrolytic solution, and to provide a battery using the current collector.

Solution to Problem

The present invention relates to a current collector including an opening formation portion provided with a plurality of openings, and is characterized in that a protrusion portion is formed at a tip of the opening, and the opening formation portion reaches an end surface of the current collector only at partial locations, and does not reach the end surface at other locations.

Advantageous Effects of Invention

According to the present invention, it is possible to provide a current collector that has high strength and is easily impregnated with an electrolytic solution, and to provide a battery using the current collector.

EXAMPLE EMBODIMENT

First Example Embodiment

Figure 1:
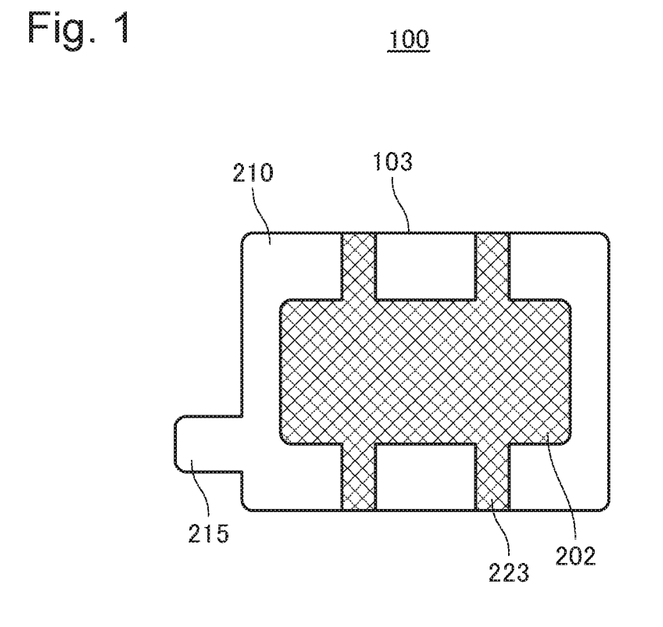
FIG. 1 is a schematic plan view illustrating a current collector according to a first example embodiment of the present invention.

FIG. 1 is a schematic plan view illustrating a current collector foil 100 according to a first example embodiment of the present invention. In the present example embodiment, an area provided with a plurality of openings (an opening formation portion 202) is formed in a large area of a center portion excluding an end surface 103 in a flat current collector foil. Further, four opening formation portions 223 that reach the end surface 103 and provided with a plurality of openings are provided in parts of the opening formation portion 202.

Tips of the openings of the opening formation portions 202 and 223 are protruded and thereby form protrusion portions. Parts 210 other than the opening formation portions 202 and 223 in the current collector foil 100 remain flat. In FIG. 1, there are formed four thin opening formation portions 223 connecting the central opening formation portion 202 to two sides, from among four sides of the current collector foil 100, which has no lead portion 215 (a positive-electrode lead portion or a negative-electrode lead portion). An electrode is formed by forming an active material layer (not illustrated) or the like on one surface or both surfaces of the current collector foil 100. The electrode is formed as a stacked body by stacking a plurality of layers, and is placed in a bag-shaped exterior body in a vertical state where the long side thereof is directed vertically, and an electrolytic solution is injected from an upper injection port. When the electrode includes the opening formation portion, the electrolytic solution impregnates from not only a peripheral portion of the stacked body, but also from a surface of the outermost layer in the stacked body in such a way as to cross between the layers of the stacked body. Meanwhile, when no opening formation portions exist in the end surface of the electrode, an impregnation speed in this part is slow, and it is difficult for air to escape from the gaps in the stacked body. In FIG. 1, there is a portion such as the opening formation portion 223 connecting an end portion and an inner portion of the stacked body. Thus, impregnation from a lower portion of the stacked body is accelerated, and all the gaps can be impregnated with an electrolytic solution in such a way that the electrolytic solution does not form an air accumulation spot. Further, the opening formation portion is provided in such a way as to reach a part of the end surface, but does not reach the other greater parts of the end surface. For this reason, it is possible to resist stress that acts on the end surface by expansion or contraction of the active material due to charge or discharge.

In order to improve performance of impregnation of the electrolytic solution, a length (the sum of widths of the four opening formation portions 223) of the parts where the opening formation portions 223 reach the end surface 103 is preferably equal to or larger than 10% of the sum of lengths of the sides (the two upper and lower sides in FIG. 1) that are in the current collector foil 100 provided with the opening formation portions 223, and is more preferably equal to or larger than 20% of the sum of the lengths. Meanwhile, in order to resist stress acting on the end surface of the current collector foil due to expansion or contraction of the active material, the length concerning the opening formation portions 223 is preferably equal to or smaller than 80% of lengths of the sides that are in the current collector foil 100 provided with the opening formation portions 223, and is more preferably equal to or smaller than 60% of the sum of the lengths.

Figure 6:
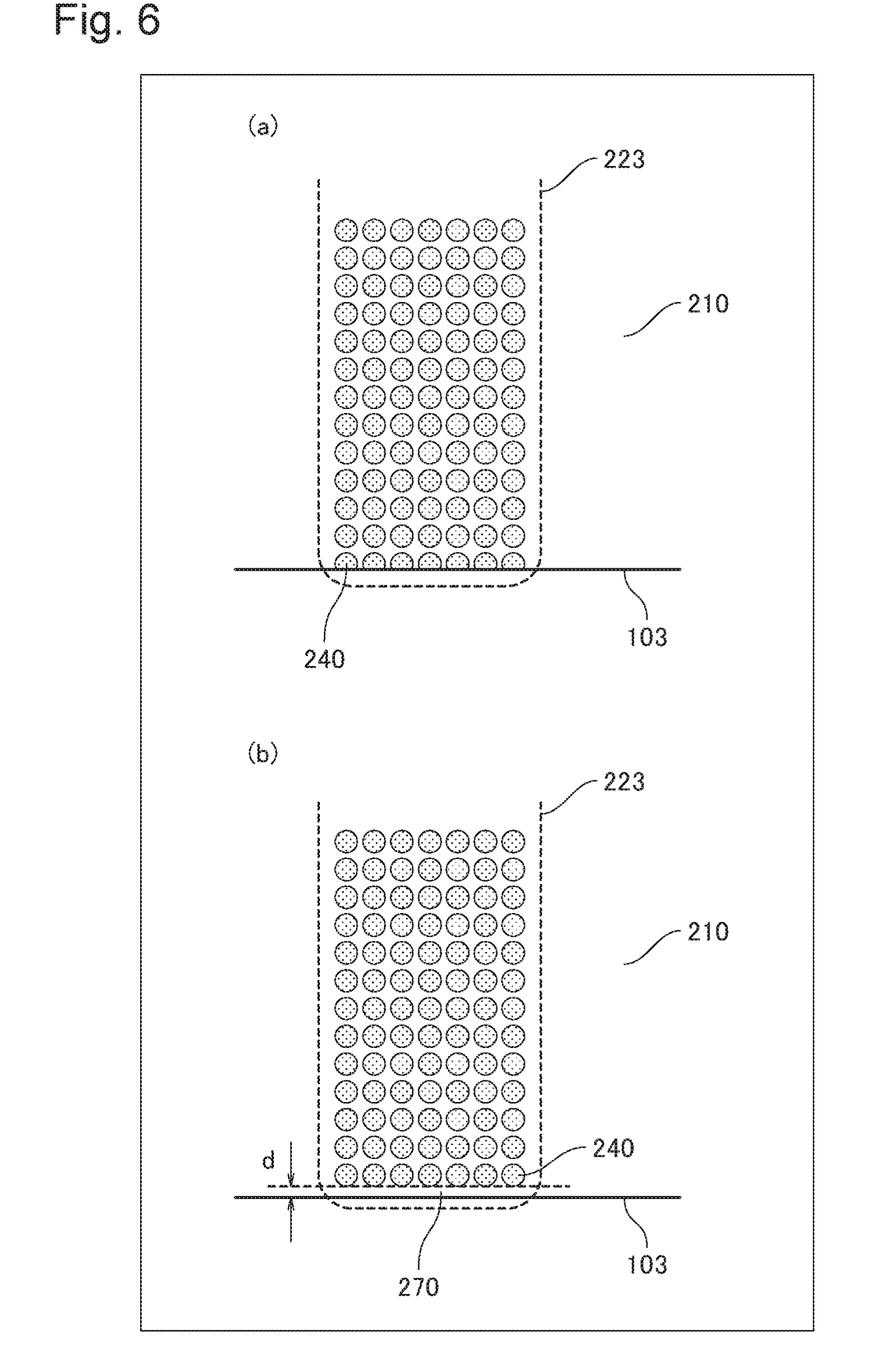
FIG. 6 is a schematic plan view illustrating a positional relation between an end surface and openings of the current collector according to the first example embodiment of the present invention, (a) illustrates the case where the openings reach the end surface of the current collector, and (b) illustrates the case where the openings do not reach the end surface.

Openings 240 in the opening formation portion 223 may be formed in such a way as to overlap with the end surface 103 as illustrated in (a) of FIG. 6, or may be formed in such a way as not to overlap with the end surface 103 as illustrated in (b) of FIG. 6. In the latter case, a peripheral portion 270 exists between the openings 240 in the opening formation portion 223 and the end surface 103. The peripheral portion 270 may have a width d set at an extent of not hindering the impregnation of the electrolytic solution, and for example, the width d may be set as approximately an opening diameter of the opening 240 or a pitch between the openings.

Further, a thickness of the current collector foil is desirably equal to or larger than 5 μm, and is more desirably equal to or larger than 6 μm, since stress can be more resisted by a larger thickness. Furthermore, in the case of the negative electrode, examples of the material include an electrolytic copper foil, a rolled copper foil, and a stainless-steel foil, and in order to resist stress, the rolled copper foil is preferable, and the stainless-steel foil is more preferable.

After the current collector foil 100 is formed, a compound to be formed into the active material layer is coated on both entire surfaces of the current collector foil 100 with a die coater or the like. As described above for FIGS. 7 and 8, the positive-electrode current collector foil and the negative-electrode current collector foil are alternately and repeatedly stacked via a separator, are housed in an exterior container, and are impregnated with an electrolytic solution. Then, the exterior container is enclosed, and the battery is completed.

Note that the number of the opening formation portions 223 may be one, but it is preferable that a plurality of the opening formation portions 223 are formed when efficiency of impregnation of an electrolytic solution is taken into consideration.

As described above, according to the present example embodiment, the current collector has high strength, and moreover, an electrolytic solution becomes easy to impregnate.

Further, in order to form the openings in the current collector foil, convex portions are provided on a surface of a press machine, and the openings are formed by performing perforation processing (punching) with the press machine. By this processing, the openings are made to protrude, and protrusion portions are formed at tips of the openings. The press machine may be flat-plate-shaped or roll-shaped. When a roll press machine is used, a diameter of a roller, a density and positions of the convex portions on a roller surface, a moving speed of the current collector foil, a rotational speed of the roller, and the like are adjusted in such a way that the opening formation portion has the shape illustrated in FIG. 1. Note that the formation may be made by the punching from both sides of the current collector foil, or the punching may be performed only from one side. Alternatively, the openings may be formed by etching. In addition, a compound to be formed into the active material layer may be coated only on the one surface of the current collector foil.

Furthermore, the current collector foil 100 of the present example embodiment may be used in either the positive electrode or the negative electrode, but as described above, expansion or contraction of the active material due to charge or discharge is greater in the negative electrode, and larger stress acts on the end surface of the current collector foil. For this reason, the use in the negative electrode is more effective. In addition, when the positive-electrode compound layer is thicker than the negative-electrode compound layer, the use in the positive electrode is desirable for improving performance of impregnation of an electrolytic solution into the positive-electrode compound layer. Further, in order to improve performance of impregnation into the entire current collector, it is preferable to form the openings in the current collector foils in both of the positive electrode and the negative electrode. Further, when the punching is performed in such a way that the positions where the opening formation portions 223 are connected to the end surfaces 103, or the connection positions and shapes of the opening formation portions 223 overlap with each other between the positive electrode and the negative electrode, a flow path for electrolytic-solution impregnation in the layer stacked direction has the shortest distance and thereby the effectiveness is enhanced.

Further, performance of impregnation of an electrolytic solution is high in the case where the shape of the positive-electrode opening formation portions 223 and 202 and the shape of the negative-electrode opening formation portions 223 and 202 match each other when the stacked body is formed by stacking the electrodes. The same applies to the following example embodiments.

Second Example Embodiment

Figure 2:
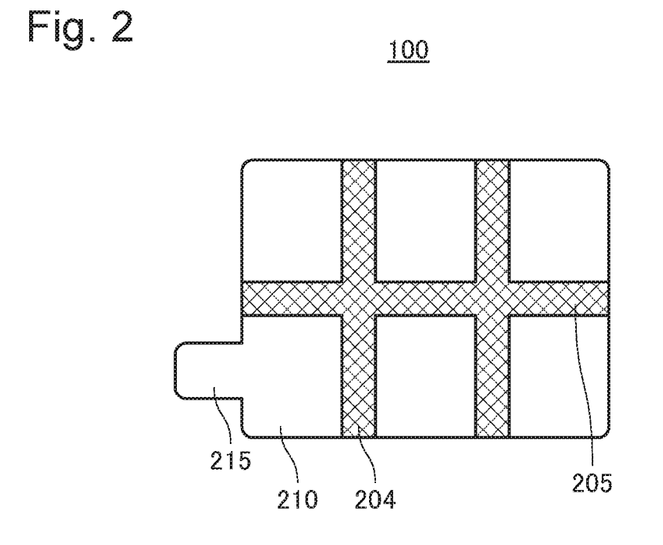
FIG. 2 is a schematic plan view illustrating a current collector according to a second example embodiment of the present invention.

FIG. 2 is a schematic plan view illustrating a second example embodiment of the present invention. In the present example embodiment, elongated opening formation portions are formed in a cross shape in a flat current collector foil 100. The opening formation portion 205 is formed to pass from a side where a lead portion 215 exists but from the location other than the lead portion, to a side opposite thereto. By crossing this, the two similar elongated opening formation portions 204 are formed to pass from a different side in the current collector foil 100 to a side opposite thereto, thereby forming the cross shapes.

Accordingly, an electrolytic solution easily permeates from the peripheral into a center portion of a flat portion 210 of the current collector foil, similarly to the case of FIG. 1. Since a large opening portion does not exist in the center portion, an electrolytic solution impregnates successively from a long-side part and a short-side part at a lower part. Therefore, it is further difficult for an air accumulation spot to be generated, which is preferable.

Third Example Embodiment

Figure 3:
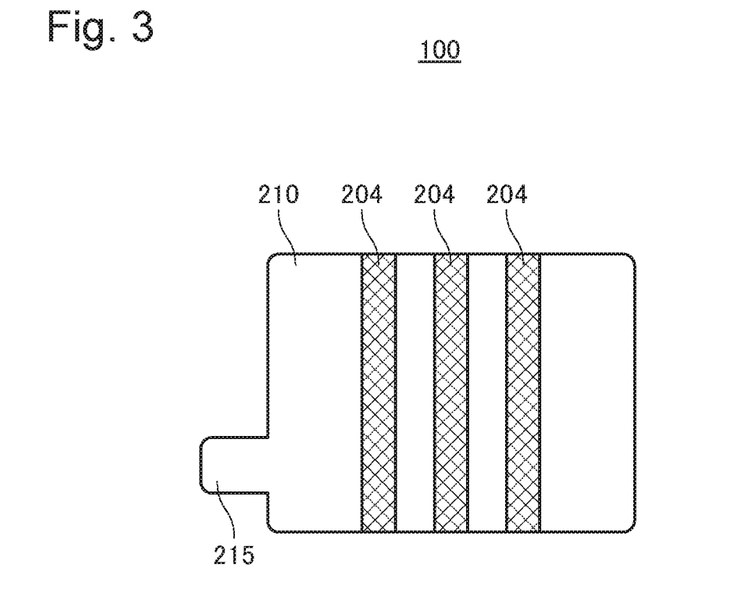
FIG. 3 is a schematic plan view illustrating a current collector according to a third example embodiment of the present invention.

FIG. 3 is a schematic plan view illustrating a third example embodiment of the present invention. In the present example embodiment, three opening formation portions 204 are formed to have elongated shapes and to reach, at both ends thereof, both ends of a flat portion 210 of the current collector foil.

Since an electrolytic solution impregnates successively from a long-side part at a lower part, it is more difficult for an air accumulation spot to be generated, which is preferable. However, in the case of a large electrode whose one side is longer than 200 mm, it is preferable to provide an opening formation portion 202 of a large area in the center portion of the current collector foil 100 as in the first example embodiment, since impregnation of an electrolytic solution is accelerated.

Further, in the present example embodiment, the opening formation portion 204 is positioned at a center portion of the long side of the current collector foil 100, and for this reason, it is difficult for an air accumulation spot of a non-opening portion to be formed, which is preferable.

Fourth Example Embodiment

Figure 4:
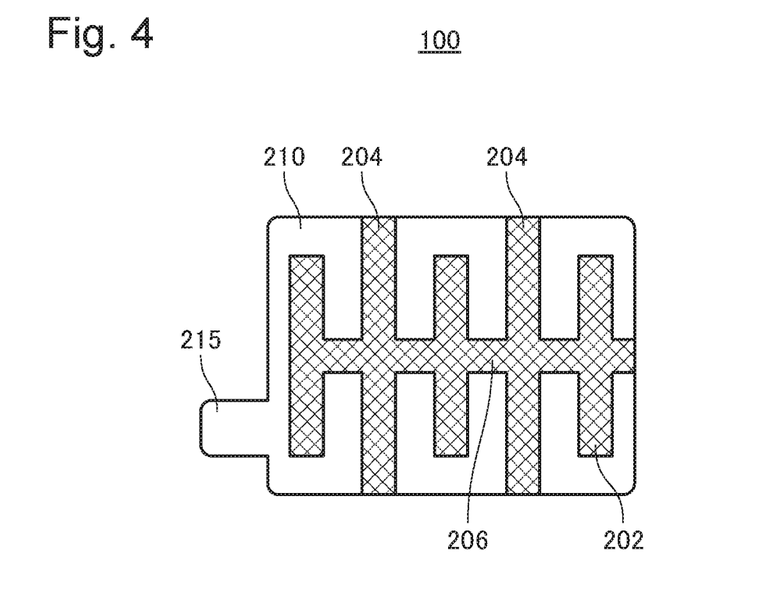
FIG. 4 is a schematic plan view illustrating a current collector according to a fourth example embodiment of the present invention.

FIG. 4 is a schematic plan view illustrating a fourth example embodiment of the present invention. In the present example embodiment, three elongated rectangular opening formation portions 202 that do not reach an end surface are formed from a side with no lead portion to a side opposite thereto. In addition, two opening formation portions 204 that reach the end surface are formed between the three opening formation portions 202. Further, an opening formation portion 206 that crosses all of the opening formation portions 202 and 204 is provided.

Since the opening formation portions 202 and 204 are connected by the opening formation portion 206, an electrolytic solution permeates more quickly into depth.

Fifth Example Embodiment

Figure 5:
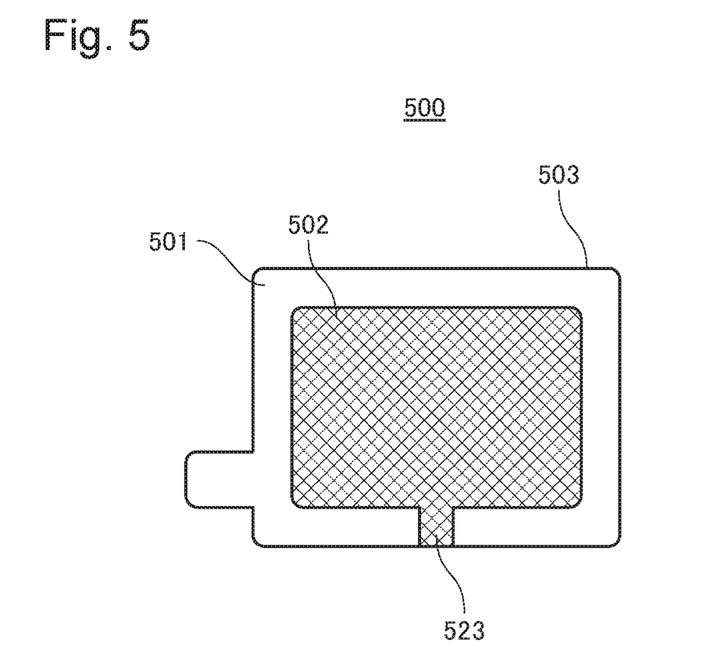
FIG. 5 is a schematic plan view illustrating a current collector according to a fifth example embodiment of the present invention.

FIG. 5 is a schematic plan view of a current collector 500 according to a fifth example embodiment of the present invention. An opening formation portion 502 is provided in a flat current collector sheet 501. The opening formation portion 502 reaches an end surface 503 of the current collector sheet 501 only at a partial location 523, and does not reach the end surface 503 at the other locations.

With such a configuration, an electrolytic solution easily permeates into the opening formation portion 502 from the periphery of the current collector 500 through the connection portion 523. Further, since openings are not formed at most of the end surfaces apart from the partial location 523, it is possible to resist stress acting on the end surfaces caused by expansion or contraction of the active material due to charge or discharge.

Other Example Embodiments

A plurality of positive-electrode lead portions and negative-electrode lead portions are bundled and subjected to ultrasonic bonding, and the bonded parts are welded to respective positive electrode terminal and negative electrode terminal. For this reason, it is desirable that in the positive-electrode lead portion, the negative-electrode lead portion, and the peripheral thereof, openings are not formed in parts used in the bonding and the welding and in parts on which stress acts by bonding, welding, usage, transportation, and the like.

Although the example embodiments are described above, there is an example that providing no opening formation portions results in consuming approximately 24 hours when injecting a highly viscous electrolytic solution. It is estimated that the opening formation portion 202 formed in the center portion of the current collector foil shortens the time by approximately 6 hours (approximately ¼). Further, it is estimated that the opening formation portion reaching the end surface shortens the time by approximately 3 hours (approximately ⅛), and thus, the total shortening of approximately 9 hours (9/24 that is nearly equal to approximately 37%) in total can be obtained.

(Electrode Constituent Material)

Herein, the description is made on materials that constitute the electrode and further on an insulation layer. The following describes examples. The materials are not particularly limited and known materials can be used.

Examples of a usable material of the positive-electrode current collector includes aluminum, gold, platinum, or the like. A material of the negative-electrode current collector is similar to that of the positive-electrode material, but particularly includes, as usable examples thereof, copper, iron/nickel/chromium-based or molybdenum-based stainless steel, aluminum, aluminum alloy, platinum, gold, palladium, iridium, rhodium, or the like.

Examples of a usable positive-electrode active material include $LiNiO_2$ and $Li_yNi_{(1-x)}M_xO_2$ ... (Formula A) (here, $0 \leq x < 1$, $0 < y \leq 1.2$, M is at least one kind of element selected from a group consisting of Co, Al, Mn, Fe, Ti, and B).

Further, other examples include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\beta+\gamma+\delta=1$, $\beta \geq 0.6$, preferably $\beta \geq 0.7$, $\gamma \leq 0.2$), and particularly include $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, preferably usable examples include $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$. Note that when a content of Ni is increased (e.g., larger than 0.6), an energy density of the battery can be made high, and even in such a case, the present invention is effective.

Furthermore, two or more kinds of compounds represented by the above-described (Formula A) may be used as a mixture, and for example, it is also preferable that NCM532 or NCM523 and NCM433 are mixed at a ratio ranging from 9:1 to 1:9 (in a typical example, 2:1) and used. In addition, in (Formula A), by mixing a material whose Ni content is high (x is equal to or smaller than 0.4) and a material whose Ni content does not exceed 0.5 (x is equal to or larger than 0.5, for example NCM433), a battery having a large capacity and high thermal stability can be configured.

In addition to the above, examples of the positive-electrode active material include: lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials composed by replacing parts in these transition metals with other metals; materials composed by making Li in these lithium transition metal oxides excessive as compared to a stoichiometric composition; and materials having an olivine structure such as $LiFePO_4$. Further, it is possible to use materials in which these metal oxides are partially replaced with Al, Fe, P, Ti, Si, Pb, Sn, In, Bi, Ag, Ba, Ca, Hg, Pd, Pt, Te, Zn, La, or the like. The positive-electrode active materials described above can be used as a single kind thereof or in combination of two or more kinds thereof.

The negative-electrode active material includes, as a negative electrode active material, metal and/or metal oxide and carbon. Examples of the metal include Li, Al, Si, Pb, Sn, In, Bi, Ag, Ba, Ca, Hg, Pd, Pt, Te, Zn, La, and alloy of two or more kinds thereof. Further, these kinds of metal or alloy may be used as a mixture of two or more kinds thereof. Further, these kinds of metal or alloy may include one or more kinds of non-metallic elements.

Examples of the metal oxide include silicon oxide, aluminum oxide, tin oxide, indium oxide, zinc oxide, lithium oxide, and a composite thereof. In the present example embodiment, it is preferable that the negative-electrode active material includes tin oxide or silicon oxide, and it is more preferable to include silicon oxide. This is because silicon oxide is relatively stable and has a low probability of causing reaction with other compounds. Further, for example, 0.1 mass % to 5 mass % of one or more kinds of elements selected from nitrogen, boron, and sulfur can be added to the metal oxide. Thereby, electrical conductive characteristic of the metal oxide can be improved. In addition, metal or metal oxide can be coated with a conductive material such as carbon in a method such as vapor deposition, thereby similarly improving the electrical conductivity.

Examples of carbon include graphite, amorphous carbon, diamond-like carbon, a carbon nanotube, and a composite thereof. Here, graphite with high crystallinity has high electrical conductive characteristic, and is excellent in voltage flatness and adhesiveness with a negative-electrode current collector made of metal such as copper. Meanwhile, amorphous carbon having low crystallinity is relatively small in volume expansion, and thus has a high effect of alleviating the volume expansion of an entire negative electrode, and has a low probability of degradation due to non-uniformity such as crystal grain boundaries and defects.

Metal and metal oxide have a feature that lithium acceptability is much greater than that of carbon. Accordingly, using a large amount of metal and metal oxide as the negative-electrode active material can improve an energy density of the battery. In order to achieve a high energy density, it is preferable that a content ratio of metal and/or metal oxide in the negative-electrode active material is high. A larger amount of metal and/or metal oxide results in more increase in a capacity of the entire negative electrode, and is thus preferable. The metal and/or metal oxide is included in the negative electrode preferably at an amount equal to or larger than 0.1 mass % of the negative electrode active material, more preferably at an amount equal to or larger than 1 mass % of the same, and still more preferably at an amount equal to or larger than 10 mass % of the same. However, metal and/or metal oxide is large in volume change when lithium is stored or released, as compared to carbon, and electrical connection is lost in some cases. For this reason, the amount is equal to or smaller than 99 mass % of the same, and is preferably equal to or smaller than 90 mass % of the same. As described above, the negative-electrode active material is a material capable of reversibly receiving and releasing lithium ions, accompanying charge and discharge in the negative electrode, and does not include other binders and the like.

The insulation layer preferably has heat resistance, and is made of heat resistant resin such as engineer plastic or an inorganic material such as metal oxide. Using these materials as insulation fillers enables formation of the insulation layer including a binder that binds the insulation filler. Concerning the insulation layer formed on the positive electrode, a constituent material of the insulation layer preferably has oxidation resistance in the case of installation on the positive electrode that includes, as the positive-electrode active material, lithium nickel composite oxide having a high nickel content.

Examples of the inorganic material include metal oxide and nitride, specifically, aluminum oxide (alumina), silicon oxide (silica), titanium oxide (titania), zirconium oxide (zirconia), magnesium oxide (magnesia), zinc oxide, strontium titanate, barium titanate, aluminum nitride, and silicon nitride. However, these materials do not melt, and thus, are preferably used as inorganic particles together with the above-described binder. As compared to organic particles, the inorganic particles are preferable because they have oxidation resistance.

Examples of the organic material include polyimide, polyamideimide, polyphenylene sulfide, polysulfone, polyethersulfone, polyetherimide, polyetheretherketone, and silicone rubber. The material that can melt in an organic solvent and can be coated is preferable in easier formation of the insulation layer than in the case of the inorganic particles. Further, the organic material is preferable in that a weight of the battery can be reduced because it has specific gravity lower than that of the inorganic material.

When binders are used for the positive-electrode active material, the negative-electrode active material, and the insulation layer, the binders particularly for the positive-electrode active material and the insulation layer formed on the positive electrode are preferably those having excellent oxidation resistance, and are more preferably those having a smaller value of a highest occupied molecular orbit (HOMO) acquired by molecular orbital calculation. A polymer including halogen such as fluorine or chlorine is excellent in oxidation resistance, and is thus suitable for the binder used in the present example embodiment. More specifically, examples of such a binder include polyolefine including fluorine or chlorine such as polyvinylidene fluoride (PVdF), polytetrafluoroethylene (PTFE), polyhexafluoropropylene (PHFP), polychlorotrifuruoroethylene (PCTFE), and polyperfluoroalkoxyfluoroethylene.

In addition to this, a binder used for binding an electrode compound layer may be used.

When a coating liquid (slurry) used at the time of coating the positive-electrode active material, the negative-electrode active material, and the insulation layer on the current collector foil includes an aqueous solvent (a solution that includes, as a dispersion medium for the binder, water or a mixed solvent including water as a main component), a polymer that is dispersed or dissolved in the aqueous solvent can be used. Examples of the polymer that is dispersed or dissolved in the aqueous solvent include acrylic resin. Example preferably used as the acrylic resin include a homopolymer made by polymerizing one kind of monomers such as acrylic acid, methacrylic acid, acrylamide, methacrylamide, 2-hydroxyethyl acrylate, 2-hydroxyethyl methacrylate, methyl methacrylate, ethylhexyl acrylate, or butyl acrylate. The acrylic resin may be a copolymer made by polymerizing two or more kinds of the above-described monomers. Further, the acrylic resin may be a mixture of two or more kinds of the above-described homopolymers and copolymers. Usable examples other than the above-described acrylic resin include: styrene butadiene rubber (SBR); polyolefine resin such as polyethylene (PE); and polytetrafluoroethylene (PTFE). These polymers can be used singly with only one kind or can be used in combination with two or more kinds. The form of the binder is not particularly limited, and a particulate (powdered) form may be used as it is, or a form prepared as a solution or emulsion may be used. Two or more kinds of binders may be used in respective different forms.

The coating liquid can include a material other than the above-described materials, depending on necessity. Examples of such a material include various kinds of polymer materials that can function as a thickener for the coating liquid to be described later. Particularly when an aqueous solvent is used, it is preferable that a polymer functioning as the thickener is included. Examples preferably used as a polymer functioning as the thickener include carboxymethyl cellulose (CMC) and methyl cellulose (MC).

Operation of mixing the above-described positive-electrode active material, negative-electrode active material, insulation filler, and binder into the solvent can be performed by using an appropriate kneader such as a ball mill, a homodisper, Dispermill (Registered Trademark), Claremix (Registered Trademark), Filmix (Registered Trademark), or an ultrasonic disperser.

In operation of coating the coating liquid for forming the insulation layer, an existing general application means can be used without any particular limitation. For example, by using an appropriate coating device (a gravure coater, a slit coater, a die coater, a comma coater, a dip coat, or the like), a predetermined amount of coating material for forming the insulation layer can be coated in such a way as to have a uniform thickness.

Thereafter, the coated material is dried by an appropriate drying means (e.g., at a temperature equal to or lower than 140° C., for example, at a temperature of 30° C. to 110° C.), thereby removing the solvent in the coated material for forming the insulation layer.

Figure 9:
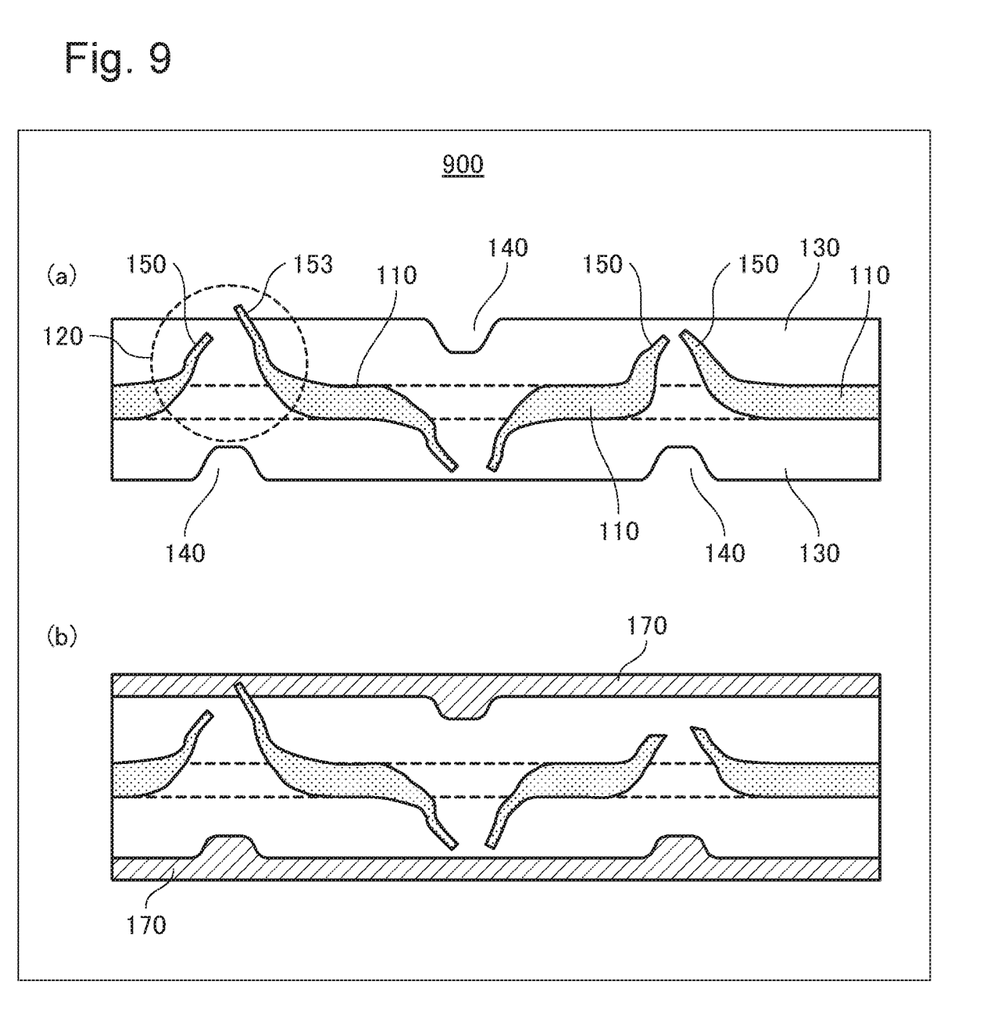
FIG. 9 is a cross-sectional view illustrating a battery electrode used in the example embodiments of the present invention, (a) is a cross section in a state where active material layers are coated on both surfaces of a current collector foil, and (b) is a cross section in a state where insulation layers are coated on the active material layers.

The current collector foil having a projection shape is coated with a coating solution including an active material, a binder, and a solvent, is dried, and is then pressed. The current collector foil is further coated with a coating solution for an insulation layer, is dried, and depending on necessity, is pressed, and thereby the electrode according to the present example embodiment can be produced. Here, in order to form the projection shape (the protrusion portions) in the current collector foil, as described above, a convex portion is provided on a surface of a press machine, and the press machine performs perforation processing (punching) on the current collector foil. After the processing, a compound to be formed into the active material layer is coated on both entire surfaces of the current collector foil by a die coater or the like. (a) of FIG. 9 illustrates a cross section of a battery electrode 900 in a state where the active material layers 130 are coated on both surfaces of the current collector foil 110. An opening 120 where a protrusion portion 150 exists at a tip thereof is formed by punching. In the example of FIG. 9, the punching is performed alternately from both sides of the current collector foil 110, and thus, the protrusion portions 150 are formed alternately on upper and lower sides with respect to the surfaces of the current collector foil. In FIG. 9, the protrusion portions are illustrated with a size being emphasized as compared to other portions of the current collector foil. Note that the current collector foil 110 becomes uneven due to the formation of the openings 120, and thus depressions 140 are formed on both surfaces of the active material layer 130. In terms of improving impregnation of an electrolytic solution and maintaining strength of the current collector foil, it is preferable that the opening portion has a size of approximately 10 μm to 100 μm at the root portion and a size of approximately 5 μm to 50 μm at the tip portion, and an opening interval is approximately 100 μm to 500 μm.

Since many protrusion portions are formed by perforation processing, it is difficult to make shapes of the openings completely uniform, and there is a case where protrusion portions 153 protruding from the active material layer 130 occur at some positions. For this reason, as illustrated in (b) of FIG. 9, insulation layers 170 are coated on the active material layers 130 to cover the protrusion portions 153, thereby preventing a short circuit between the adjacent electrodes. Thus, even when the insulation layers 170 are coated and formed on the active material layers 130, permeation of an electrolytic solution into the entire active material layer can be accelerated similarly to the case where a general separator member is configured as a separate member.

The whole or part of the example embodiments disclosed above can be described as, but not limited to, the following supplementary notes.

(Supplementary Note 1)

A current collector including an opening formation portion provided with a plurality of openings, wherein a protrusion portion is formed at a tip of the opening, and the opening formation portion reaches an end surface of the current collector only at partial locations, and does not reach the end surface at other locations.

(Supplementary Note 2)

The current collector according to Supplementary Note 1, wherein the opening formation portion reaches the end surface at a plurality of locations.

(Supplementary Note 3)

The current collector according to Supplementary Note 1 or 2, wherein the opening formation portion has a cross shape.

(Supplementary Note 4)

The current collector according to Supplementary Note 1 or 2, wherein the opening formation portion has a stripe shape.

(Supplementary Note 5)

The current collector according to any one of Supplementary Notes 1 to 4, wherein a length of a part in the opening formation portion that reaches the end surface is equal to or larger than 10% of a length of a side of the current collector on which the opening formation portion reaches the end surface.

(Supplementary Note 6)

The current collector according to any one of Supplementary Notes 1 to 4, wherein a length of a part in the opening formation portion that reaches the end surface is equal to or smaller than 80% of a length of a side of the current collector on which the opening formation portion reaches the end surface.

(Supplementary Note 7)

The current collector according to any one of Supplementary Notes 1 to 6, wherein a length of a part in the opening formation portion that reaches the end surface is equal to or larger than 20% of a length of a side of the current collector on which the opening formation portion reaches the end surface.

(Supplementary Note 8)

The current collector according to any one of Supplementary Notes 1 to 4, wherein a length of a part in the opening formation portion that reaches the end surface is equal to or smaller than 60% of a length of a side of the current collector on which the opening formation portion reaches the end surface.

(Supplementary Note 9)

The current collector according to any one of Supplementary Notes 1 to 8, wherein the opening formation portion reaches the end surface on a side where a positive-electrode lead portion or a negative-electrode lead portion of the current collector is not provided.

(Supplementary Note 10)

The current collector according to any one of the Supplementary Notes 1 to 9, wherein the opening formation portion is not provided at a part formed as a positive-electrode lead portion or a negative-electrode lead portion and at a periphery of the part.

(Supplementary Note 11)

A battery including the current collectors according to any one of Supplementary Notes 1 to 10, wherein positions where the opening formation portion reaches the end surface overlap with each other between a positive electrode and a negative electrode.

(Supplementary Note 12)

The battery according to Supplementary Note 11, wherein shapes of the opening formation portions match each other between the positive electrode and the negative electrode when a stacked body is formed.

(Supplementary Note 13)

The current collector according to any one of Supplementary Notes 1 to 12, wherein an opening of the opening formation portion overlaps with the end surface.

(Supplementary Note 14)

The current collector according to any one of Supplementary Notes 1 to 12, wherein an opening of the opening formation portion does not overlap with the end surface, and a peripheral portion is provided between the opening and the end surface.

(Supplementary Note 15)

The current collector according to Supplementary Note 14, wherein a width of the peripheral portion is a width that does not hinder impregnation of an electrolytic solution.

(Supplementary Note 16)

The current collector according to any one of Supplementary Notes 1 to 15, wherein an insulation layer is formed on an active material layer constituting the current collector.

The present invention is described above with the above-described example embodiments being cited as model examples. However, the present invention is not limited to the above-described example embodiments. In other words, the present invention can apply various forms that can be understood by those skilled in the art, within the scope of the present invention.

REFERENCE SIGNS LIST

10 Lithium ion secondary battery
100 Current collector foil
103, 503 End surface
120 Opening
130 Active material layer
140 Depression
150, 153 Protrusion portion
170 Insulation layer
210 Flat portion
215 Lead portion
202, 204, 223, 502 Opening formation portion
240 Opening
400 Battery element
500 Current collector
501 Current collector sheet
700 Negative electrode
710 Negative-electrode active material formation portion
720 Negative electrode active material un-formation portion
800 Positive electrode
810 Positive-electrode active material formation portion
820 Positive-electrode active material un-formation portion
900 Battery electrode

The invention claimed is:

1. An electrode comprising:
a current collector and an active material layer,
wherein the active material layer is coated on both entire surfaces of the current collector, and
wherein the current collector comprises a plurality of opening formation portions spaced apart from each other or connected to each other in part, a plurality of openings being formed in succession in the plurality of opening formation portions,
wherein the opening formation portions reach edge portions of the current collector at partial locations, and do not reach the edge portions at other locations, and
wherein the current collector further comprises areas other than the plurality of opening formation portions which are continuous in both longitudinal and transverse directions along the plane of the current collector, without openings formed therein, the areas having a width that can accommodate the plurality of openings.

2. The electrode according to claim 1, wherein the opening formation portions reach the edge portions at a plurality of locations.

3. The electrode according to claim 1, wherein the opening formation portions collectively form a cross shape.

4. The electrode according to claim 1, wherein the opening formation portions collectively form a stripe shape.

5. The electrode according to claim 1, wherein a width of a part in the opening formation portions that reaches the edge portions is equal to or larger than 10% of a combined length of sides of the current collector.

6. The electrode according to claim 1, wherein a width of a part in the opening formation portions that reaches the edge portions is equal to or smaller than 80% of a combined length of sides of the current collector.

7. The electrode according to claim 1, wherein a width of a part in the opening formation portions that reaches the edge portions is equal to or larger than 20% of a combined length of sides of the current collector.

8. The electrode according to claim 1, wherein a width of a part in the opening formation portions that reaches the edge portions is equal to or smaller than 60% of a combined length of sides of the current collector.

9. The electrode according to claim 1, wherein the opening formation portions are not provided at a part having a positive-electrode lead portion or a negative-electrode lead portion and at a periphery of the part.

10. The electrode according to claim 1, wherein at least one opening of at least one opening formation portion overlaps with at least one edge portion.

11. The electrode according to claim 1, wherein the openings of at least one opening formation portion do not overlap with the edge portions, and a peripheral portion is provided between the openings and at least one edge portion.

12. The electrode according to claim 11, wherein a width of the peripheral portion is a width that does not hinder impregnation of an electrolytic solution.

13. The electrode according to claim 1, wherein an insulation layer is formed on the active material layer.

14. The electrode according to claim 1, wherein the size of each opening is about 5 to 50 μm.

15. The electrode according to claim 14, wherein the spacing between the openings is 100 to 500 μm.

16. The electrode according to claim 1, wherein the areas without openings formed therein are flat.

17. A battery comprising:
a plurality of current collectors each comprising a plurality of opening formation portions spaced apart from each other or connected to each other in part, and a plurality of openings being formed in succession in the plurality of opening formation portions; and
an active material layer coated on both entire surfaces of each current collector of the plurality of current collectors,
wherein a protrusion portion is formed at a tip of at least one opening of the plurality of openings,
wherein the opening formation portions reach edge portions of the current collector at partial locations, and do not reach the edge portions at other locations,
wherein positions where at least one opening formation portion of the plurality of opening formation portions reaches the edge portion overlap with each other between a positive electrode and a negative electrode, and
wherein at least one current collector of the plurality of current collectors further comprises areas other than the plurality of opening formation portions which are continuous in both longitudinal and transverse directions along the plane of the current collector, without openings formed therein, the areas having a width that can accommodate the plurality of openings.

18. The battery according to claim 17, wherein shapes of the plurality of opening formation portions match each other between the positive electrode and the negative electrode when a stacked body is formed.

19. The battery according to claim 17, wherein the opening formation portions reach the edge portions at a plurality of locations.

20. The battery according to claim 17, wherein the opening formation portions collectively form a cross shape.

21. The battery according to claim 17, wherein the opening formation portions collectively form a stripe shape.

22. The battery according to claim 17, wherein a width of a part in the opening formation portions that reaches the edge portions is equal to or larger than 10% of a combined length of a sides of the current collector, or is equal to or smaller than 80% of the combined length of sides of the current collector.

23. The battery according to claim 17, wherein a width of a part in the opening formation portions that reaches the edge portions is equal to or larger than 20% of a combined length of sides of the current collector, or is equal to or smaller than 60% of the combined length of sides of the current collector.

* * * * *